United States Patent [19]

Brunelle et al.

[11] Patent Number: 4,462,155

[45] Date of Patent: Jul. 31, 1984

[54] PIN LOCATOR

[75] Inventors: Dennis S. Brunelle, South Hadley, Mass.; Daniel A. Esakov, West Hartford, Conn.

[73] Assignee: Combustion Engineering, Inc., Windsor, Conn.

[21] Appl. No.: 364,348

[22] Filed: Apr. 1, 1982

[51] Int. Cl.$^3$ .................... H01R 43/00; B23P 21/00

[52] U.S. Cl. .................................... 29/857; 29/747; 324/66

[58] Field of Search ................ 29/857, 729, 842, 758, 29/845, 750, 407, 747, 701, 748, 720, 739; 324/66, 73 R

[56] References Cited

U.S. PATENT DOCUMENTS

| | | | |
|---|---|---|---|
| 2,806,995 | 9/1957 | Meanley | 324/66 |
| 3,052,842 | 9/1962 | Frohman et al. | 29/701 X |
| 3,407,480 | 10/1968 | Hill et al. | 29/407 X |
| 4,038,501 | 7/1977 | Volk | 324/66 X |
| 4,114,091 | 9/1978 | Howard | 324/66 |

*Primary Examiner*—Howard N. Goldberg
*Assistant Examiner*—Carl J. Arbes
*Attorney, Agent, or Firm*—David L. Smith

[57] ABSTRACT

Element insertion location apparatus (60) is connected to a completed first end (79) of a cable (80) to locate the position for inserting an element (82) attached to a conductor of the cable (80) in a cable connector (84) at the second end (81) of the cable (80). A power supply (64) energizes a plurality of electrical circuits each containing a light emitting diode (1 through 52). Each of the circuits is connected to one element of a cable connector (76,78). The completed first end (79) of a cable (80) is also connected to the cable connector (76,78). Upon placing an element (82) attached to a conductor at the second end (81) of a cable (80) into an element insertion tool (62) grounded (66) to a power supply (64) one of the circuits is completed illuminating a light emitting diode (1 through 52). The light emitting diodes (1 through 52) are in an array (86) that represents the physical arrangement of the element insertion locations in a cable connector (84). The illuminated light emitting diode (1 through 52) in the array (86) indicates the location that the element (82) in contact with the grounded element insertion tool (62) should be inserted in the cable connector (84).

7 Claims, 6 Drawing Figures

PIN LOCATOR

BACKGROUND OF THE INVENTION

This invention relates to fabricating cables and in particular to locating the position for inserting an element attached to the end of a conductor of the cable in a cable connector during fabrication.

Insertion of pins and sockets into cable connectors in the manufacture of cables has heretofore been a manual process using a hand tool. The hand tool was either a plier-like or screwdriver-like device adapted to hold a pin or socket for manual insertion of the pin or socket into a cable connector. Using either of these hand tools is fatiguing as a force of approximately 222 newtons (50 pounds) is required to insert a pin or socket into the cable connector. These hand tools will accommodate a pin or socket with or without a conductor connected.

A manually operated press in the prior art is available to insert pins or sockets into cable connectors. However, the prior art press will accommodate only pins or sockets without conductors attached. The press reduces fatigue by providing a mechanical advantage to the operator thereby reducing the force required to insert a pin or socket into the cable connector.

When fabricating a cable, pins crimped onto one end of the cable conductors are inserted into a cable connector at that end while sockets crimped onto the other end of the cable conductors are inserted into a cable connector at that end of the cable. The pins or sockets inserted into the cable connector of the first end of the cable can be inserted without regard to location. However, when fabricating the second end of a cable, it is imperative that the location of a pin or socket in the cable connector for a given conductor corresponds to the location of the socket or pin in the cable connector for the same conductor in the first end of the cable.

Heretofore, when fabricating the second end of a cable, the appropriate location to insert a pin or socket into a cable connector was determined in the following manner. The first lead of a battery operated buzzer wired in series with a battery was placed in contact with a pin or socket in the completed cable connector of the first end of the cable. The second lead of the buzzer-battery combination was randomly placed in contact with each of the sockets or pins not inserted in a cable connector on the uncompleted second end of the cable until the buzzer sounded, signifying continuity. The socket or pin to be inserted into the cable connector of the second end of the cable was thus identified. The appropriate location to insert the socket or pin corresponds to the location of the pin or socket in the completed first end of the cable that is in contact with the first lead of the buzzer-battery combination.

A need exists for a method and apparatus to rapidly identify the physical location for insertion of a pin or socket into a cable connector at the second end of a cable during cable fabrication. The apparatus would eliminate the randomness formerly associated with determining the appropriate location for insertion of a pin or socket thereby reducing the time required to manufacture a cable.

SUMMARY OF THE INVENTION

The present invention fulfills the need of a method and apparatus to locate the position for inserting a pin or socket attached to the end of a conductor of a cable in the cable connector at the second end of a cable. During fabrication of a multiconductor cable, a completed first end of the cable is connected to a cable connector on the element insertion location apparatus. A power supply energizes a plurality of electrical circuits, each of which is connected to the power supply and to one element of the cable connector on the element insertion apparatus. Each circuit contains a device to indicate that the electrical circuit is completed. The indicating devices are arranged in an array that represents the physical arrangement of the element insertion locations in a cable connector at the second end of the cable. When an element attached to a conductor of the cable at the second end of the cable is placed in electrical contact with an element insertion tool grounded to the power supply, one of the circuits is completed and the indicating device in that circuit indicates the physical location in the cable connector at the second end of the cable into which the element in contact with the grounded insertion tool should be inserted. After insertion of the element in the cable connector, when the element is removed from the element insertion tool, the formerly closed circuit is opened and the indicating device returns to a deenergized state

DESCRIPTION OF THE PREFERRED EMBODIMENT

Figure 1:
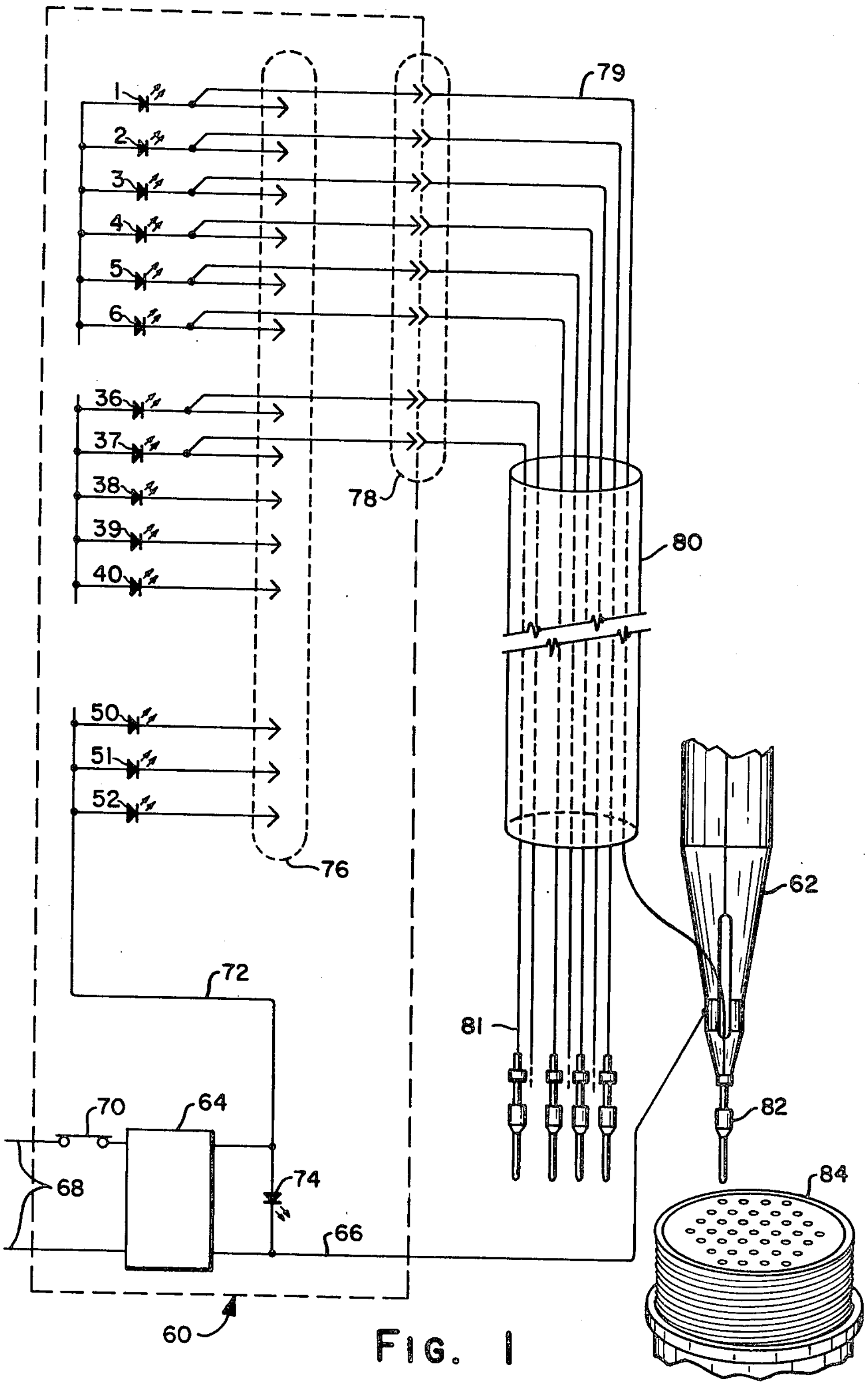
FIG. 1 is an electrical schematic of an element insertion location apparatus embodying the present invention.

Referring to the drawing, there is depicted therein an element insertion location apparatus 60 designed in accordance with the present invention as best seen schematically in FIG. 1. Element insertion location apparatus 60 is used in conjunction with an element insertion tool 62 in the manufacture of cables. Element insertion tool 62 is gounded to power supply 64 by conductor 66. Power supply 64 is connected across a voltage source by leads 68. Switch 70 turns power supply 64 on or off. Power supply 64 converts the incoming alternating current voltage to a low level direct current voltage and applies the direct current voltage on the order of 5 volts to output conductor 72. Power on light emitting diode 74 lights when conductor 72 is energized indicating that the power supply is turned on and is operating. Conductor 72 energizes the anode of each of light emitting diodes 1 through 52. The cathode of each light emitting diode 1 through 52 is wired to an element of cable connector 76. Cable connector 76 is a fifty-two conductor cable connector. In addition, the cathode of each light emitting diode 1 through 37 is wired to an element of cable connector 78. Cable connector 78 is a thirty-seven conductor cable connector.

FIG. 1 shows a completed first end 79 of thirty-seven conductor cable 80 connected to cable connector 78.

The completed first end 79 of a cable 80 can be either a cable connector with sockets attached to the conductors and inserted in the cable connector, or a cable connector with pins attached to the conductors and inserted in the cable connector.

When element 82, either a pin or a socket, is placed in electrical contact with grounded element insertion tool 62, an electrical circuit is completed illuminating one light emitting diode of light emitting diodes 1 through 52. FIG. 1 shows a completed circuit with light emitting diode 1 illuminated; grounded element insertion tool 62 is shown as but not limited to a press.

Figure 2:
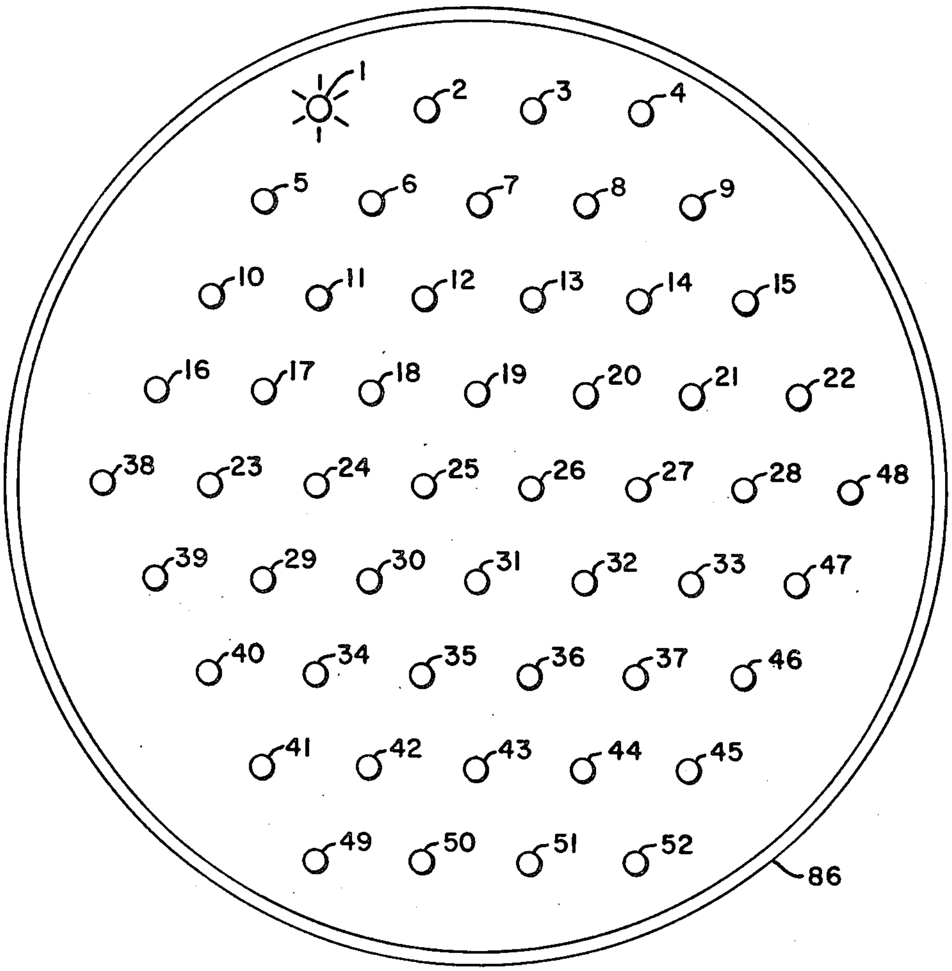
FIG. 2 is the physical arrangement of the light emitting diodes shown in FIG. 1 representing the element insertion locations of a cable connector.

FIG. 2 shows the physical arrangement of light emitting diodes 1 through 52. The physical arrangement of light emitting diodes 1 through 52 within array 86 correspond to element insertion locations in a cable connector. The physical array 86 of light emitting diodes in FIG. 2 is used to determine the element insertion location for both thirty-seven conductor and fifty-two conductor cables. For this reason, it is necessary that a light emitting diode 1 through 52 representing a physical location in array 86 of FIG. 2 be wired to the corresponding element in cable connector 76 or 78. A line of demarcation can indicate the various element insertion location configurations or light emitting diodes of one color can indicate a first configuration while light emitting diodes of another color supplement the first configuration to indicate a second configuration. The latter has been used where light emitting diodes 1 through 37 are red representing the element configuration for a thirty-seven conductor cable while light emitting diodes 38 through 52 are green and supplement the thirty-seven element configuration to represent a fifty-two element configuration.

The physical arrangement of light emitting diodes 1 through 37 in FIG. 2 correspond to the element insertion locations on the top surface of cable connector 84 of FIG. 1. During the fabrication of a second end 81 of a cable 80, upon placing element 82 in element insertion tool 62, the appropriate location to insert element 82 in cable connector 84 is instantly identified in the physical array 86 of light emitting diodes 1 through 52 by an illuminated light emitting diode as best seen in FIG. 2. This reduces the time required to fabricate the second end 81 of the cable 80 by eliminating the randomness formerly associated with determining the appropriate location for insertion of an element 82.

Upon removing element 82 from contact with grounded element insertion tool 62, such as after element 82 has been inserted in cable connector 84, the formerly completed circuit is opened and the corresponding formerly illuminated light emitting diode turns off. The procedure is ready for repeating with a different element 82. Hence, only one of the light emitting diodes 1 through 52 in array 86 is illuminated at a time. Furthermore, when all elements 82 have been inserted in cable connector 84, cable connector 84 can be inverted and ground conductor 66 placed in contact with each element 82, one after another, as a check to insure that elements 82 were inserted in the proper location. During this check, the array 86 of light emitting diodes shown in FIG. 2 is read backwards.

Although element insertion tool 62 may be a screwdriver-like tool, a plier-like tool or a press, cable fabrication is further enhanced when element insertion location apparatus 60 is used in conjunction with the below-described press element insertion apparatus.

Figure 3:
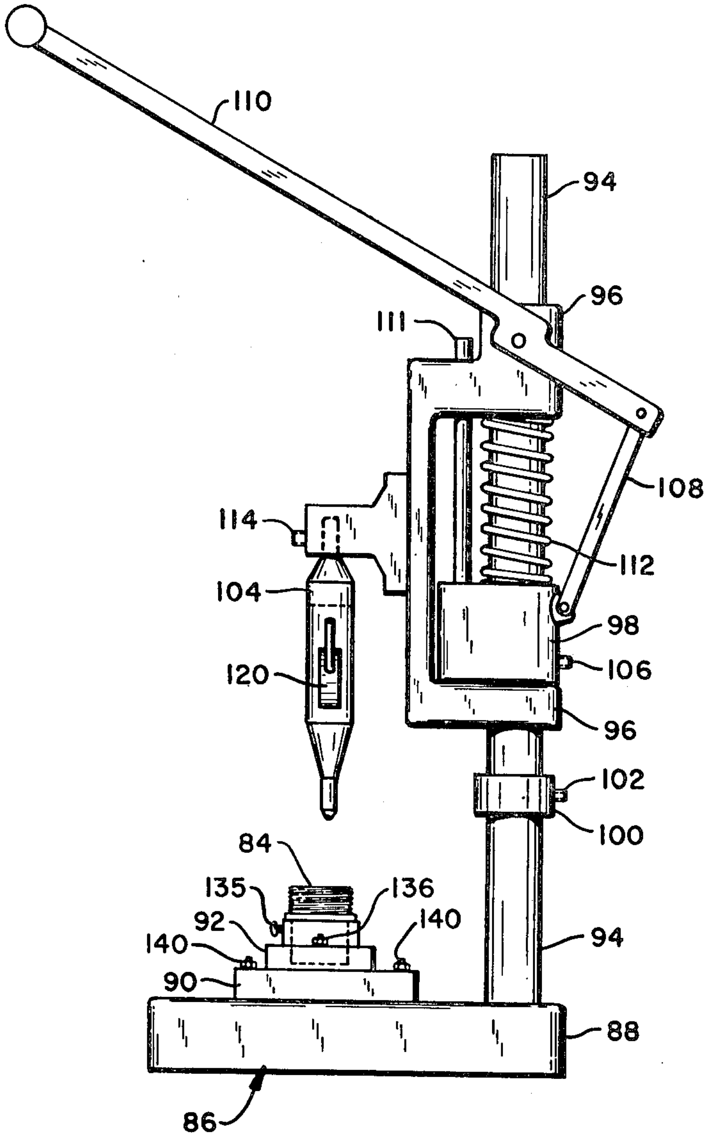
FIG. 3 is a side view of an element insertion apparatus.

Referring to the drawing, there is depicted therein a press element insertion apparatus 86 as best seen in FIG. 3. Base 88 supports a two-axis cable connector support position guide which prevents cable connector 84 from rotating during the fabrication process. Base 88 supports member 90 which restrains motion of cable connector 84 to a first direction. Member 90 supports member 92 which restrains motion of cable connector 84 to a second direction substantially perpendicular to the first direction. Member 92 supports cable connector 84. Base 88 also supports column 94.

Column element 96 is slidably engaged on column 94 and travels through a limited distance constrained by the lower portion of column element 96 between the lower surface of column bracket 98 and the upper surface of depth stop bracket 100. Depth stop bracket 100 is adjusted to limit the depth of insertion of an element in cable connector 84. Depth stop bracket 100 is retained in the desired position by depth stop bracket lock screw 102. The position of column bracket 98 on column 94 is selected to provide clearance between the lower end of element 82 and the upper surface of cable connector 84 with element 82 inserted in jaw clamp 104. Column bracket 98 is retained in its desired position by column bracket lock screw 106.

Connecting member 108 pivots both on column bracket 98 and handle 110. Handle 110 also pivots at a midpoint on column element 96 such that when the handle is moved toward base 88, column element 96 is caused to slide along column 94 and guide 111 toward base 88 compressing spring 112. Guide 111 is supported by column bracket 98 and prevents column element 96 from rotating around column 94. When element 82 is released from jaw clamp 104 and handle 110 is released, spring 112 which surrounds column 94 and is disposed between column bracket 98 and column element 96 causes column element 96 and handle 110 to return to their original position.

Jaw clamp 104 is mounted on column element 96 and is thereby constrained to move parallel to column 94 substantially perpendicular to the top surface of cable connector 84. Jaw clamp set screw 114 holds jaw clamp 104 in column element 96 and facilitates removing jaw clamp 104.

Figure 4:
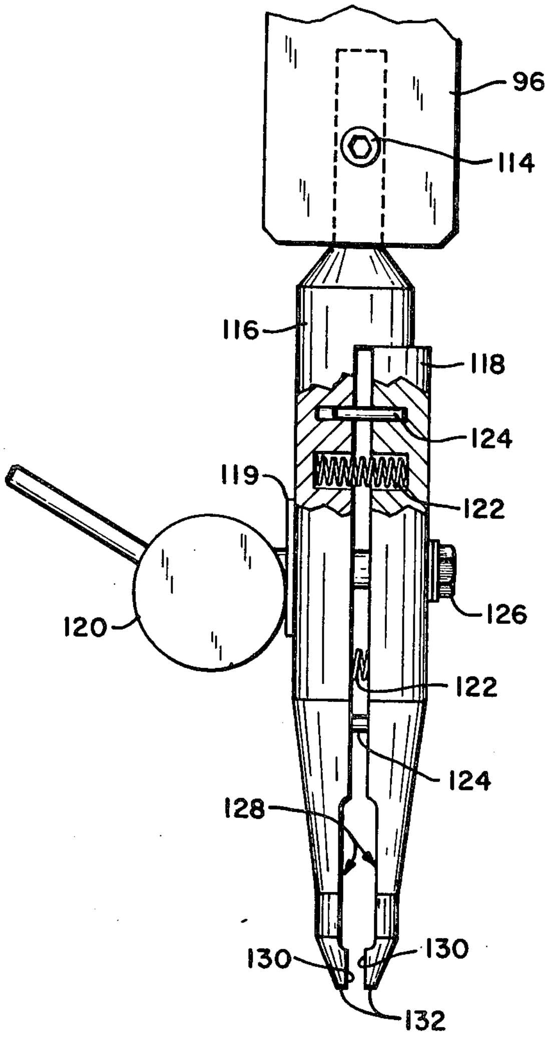
FIG. 4 shows the jaws of the element insertion apparatus of FIG. 3 in the open position.

Jaw clamp 104 is shown in the open position in FIG. 4. Stationary jaw member 116 is supported by column element 96. Movable jaw member 118 is supported by jaw member 116 and moves laterally when lever operated cam 120 is moved to its upper position. Internal springs 122 cause movable jaw member 118 to move away from stationary jaw member 116 as guided by internal guide pins 124 and limited by bolt 126 on which cam 120 pivots. Cam 120 rides on low friction guide 119. The lower portion of both stationary jaw member 116 and movable jaw member 118 is tapered to accommodate working in the limited area of a partially completed cable connector 84. Surfaces 128 form a recessed region in each jaw member 116 and 118. The recessed region formed by surfaces 128 accommodates the conductor connected to element 82 being inserted in cable connector 84. Surfaces 130 are concave to grip and hold element 82 with a conductor attached when jaw members 116 and 118 are closed. Surfaces 132 are flat to butt against the insertion shoulder of element 82.

Figure 5:
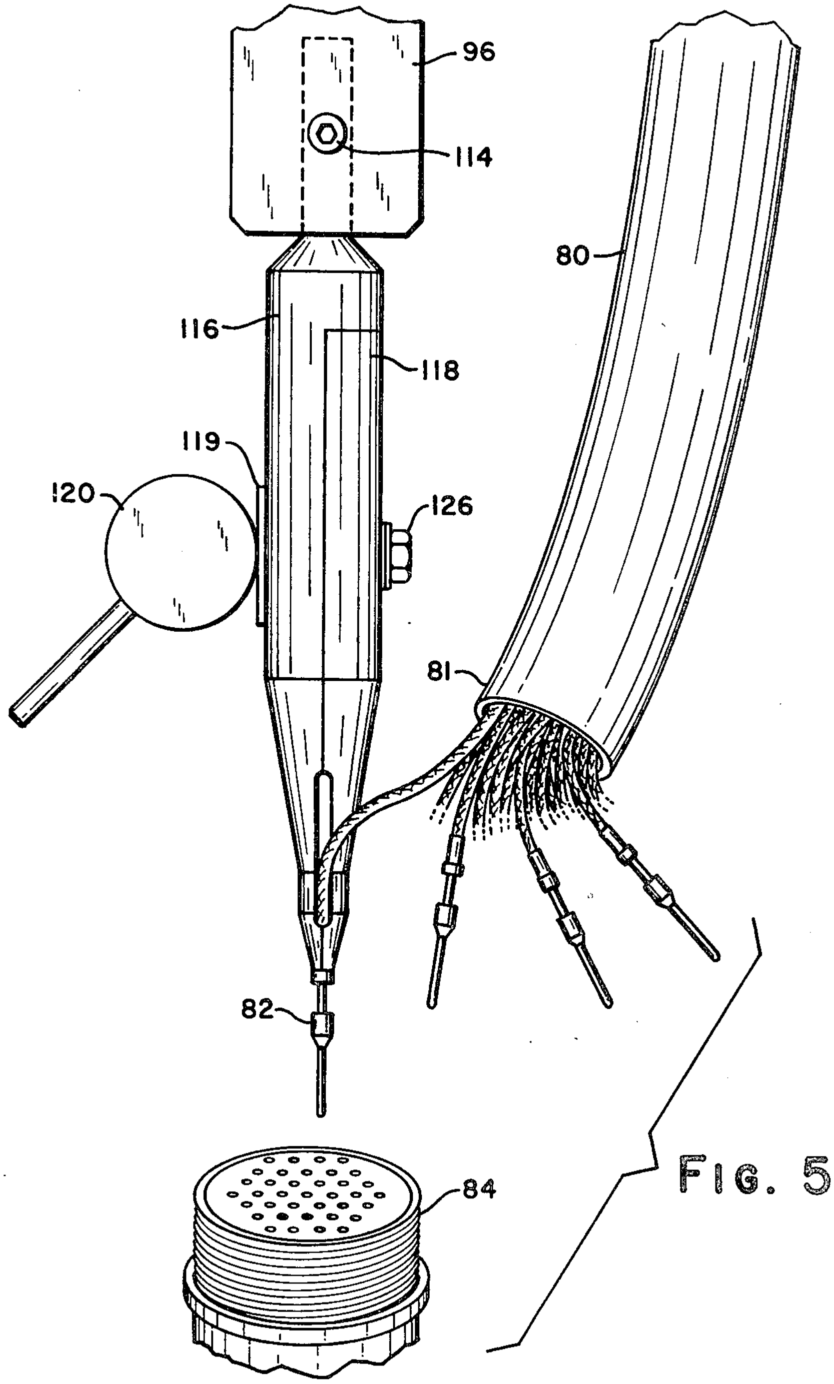
FIG. 5 shows the jaws of the element insertion apparatus of FIG. 3 in a closed position.

FIG. 5 shows jaw clamp 104 in the closed position holding element 82. Jaw clamp 104 securely holds element 82 between surfaces 130 during insertion in cable connector 84.

As can be seen from FIG. 2, the physical arrangement of elements in a cable connector can be symmetrical. To assure that the elements 82 are inserted in cable connector 84 in the proper location, it is imperative when working with the second end of cable that cable connector 84 not rotate during fabrication. However, since the element insertion array 86 is two dimensional and two elements are not inserted in the same location, it is necessary to provide cable connector 84 with two degrees of freedom.

Figure 6:
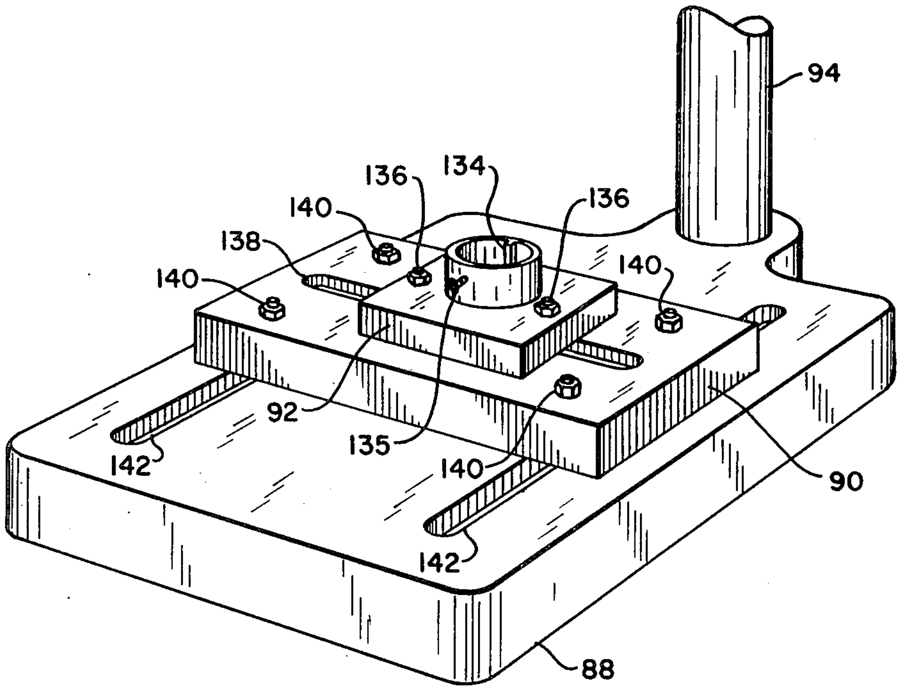
FIG. 6 shows the two-axis cable connector support position guide.

As best seen in FIG. 6, a key way in the barrel of cable connector 84 is aligned with key 134 on the internal diameter of member 92 preventing cable connector 84 from rotating relative to member 92. Locking wing bolt 135 is tightened to secure cable connector 84 in member 92. Member 92 is slidably engaged with member 90. Member 90 constrains member 92 to move in one degree of freedom as bolts 136 slide in slot 138 of member 90.

Member 90 is slidably engaged with base 88. Member 90 is constrained to one degree of freedom substantially perpendicular to slot 138 by bolts 140 which slide in slots 142. In this manner, cable connector 84 cannot rotate during the cable fabrication process and the array of element insertion locations on the top surface of cable connector 84 retains the same orientation as the physical arrangement 86 in FIG. 2 during the cable fabrication process.

Even though it is not necessary to prevent cable connector 84 from rotating during the fabrication of a first end of a cable, the rotation preventing apparatus of FIG. 6 can still be used.

Although press element insertion apparatus 86 can be used by itself, cable fabrication is particularly enhanced when press element insertion apparatus 86 is used in conjunction with the above described element insertion location apparatus 60.

Element insertion location apparatus 60 and press element insertion apparatus 86 have been described with reference to thirty-seven and fifty-two conductor cables. It is within the scope of the invention that one skilled in the art could apply the invention to fabricate multiconductor cables with any number of conductors and any element configuration.

We claim:

1. A method of connecting an electrical cable formed of a plurality of individual conductors to an end connector wherein a plurality of pin elements, one pin element attached to each of the individual conductors at the end of the cable to be connected to the end connector, are matched with and inserted into a particular insertion location in a plurality of openings in the face of the end connector for receiving the pin elements, comprising:

a. providing an array of a plurality of indicating means replicative of the openings in the face of the end connector to be connected to the cable;

b. electrically interconnecting each indicating means of the array between a source of electric current and one of the individual conductors at the end of the cable opposite to the end of the cable to be connected to the end connector; and c. sequentially grounding each individual pin element thereby causing electric current to flow through and activate the indicating means associated with the grounded pin element and inserting the grounded pin element into the particular insertion location in the face of the end connector corresponding to the activated indicating means.

2. An apparatus for connecting an electrical cable formed of a plurality of individual conductors to an end connector wherein a plurality of pin elements, one pin element attached to each of the individual conductors at the end of the cable to be connected to the end connector, must be matched with and inserted into a particular insertion location in a plurality of openings in the face of the end connector for receiving the pin elements, comprising:

a. a power supply;

b. display means;

c. a plurality of indicating means arranged on the display means in an array replicative of the openings in the face of the end connector to be connected to the cable;

d. tool means for grasping one of the pin elements and inserting the grasped pin element in one of the plurality of openings in the face of the end connector; and e. circuit means for electrically interconnecting each of the indicating means between the power supply and one of the individual connectors at the end of the cable opposite to the end of the cable to be connected to the end connector and for electrically interconnecting the tool means to the power supply whereby an electrical circuit is completed whenever a pin element is grasped in the tool means so as to activate the indicating means associated with the grasped pin element thereby indicating on the display means the particular insertion location in the plurality of openings in the face of the end connector into which the grasped pin element is to be inserted.

3. An apparatus as recited in claim 2 wherein the indicating means are light producing.

4. An apparatus as recited in claim 3 wherein the indicating means are light emitting diodes.

5. An apparatus as recited in claim 2 wherein the tool means is a plier-like tool.

6. An apparatus as recited in claim 2 wherein the tool means is a screwdriver-like tool.

7. An apparatus as recited in claim 2 wherein the tool means is a press.

* * * * *